United States Patent [19]

Welburn

[11] Patent Number: 4,532,448

[45] Date of Patent: Jul. 30, 1985

[54] FLUX DIRECTOR, TOOTH SHIELD

[75] Inventor: Ross D. Welburn, Santa Rosa, Calif.

[73] Assignee: Motornetics Corporation, Santa Rosa, Calif.

[21] Appl. No.: 529,596

[22] Filed: Sep. 6, 1983

[51] Int. Cl.³ .............................................. H02K 19/00
[52] U.S. Cl. ................................. 310/163; 310/49 R; 310/266
[58] Field of Search ................................. 310/162–165, 310/266, 216–218, 263, 49, 45

[56] References Cited

U.S. PATENT DOCUMENTS

| | | | |
|---|---|---|---|
| 1,551,271 | 8/1928 | Slepian | 310/163 |
| 1,653,946 | 12/1927 | Clausen | 310/162 UX |
| 2,107,872 | 2/1938 | Nisbet | 310/49 X |
| 2,402,214 | 6/1946 | Suydam | 310/266 |
| 2,897,384 | 7/1959 | Müller | 310/163 |
| 2,929,946 | 3/1960 | Aske | 310/266 |
| 3,163,788 | 12/1964 | Powers | 310/45 |
| 3,426,225 | 2/1969 | Bakhuizen | 310/49 |
| 3,751,696 | 8/1973 | Morreale | 310/49 |
| 3,956,650 | 5/1976 | Field | 310/49 X |
| 4,110,646 | 8/1978 | Rao | 310/163 |

Primary Examiner—Donovan F. Duggan
Attorney, Agent, or Firm—Philip M. Shaw, Jr.

[57] ABSTRACT

A toothed, synchronous reluctance motor of the type having a motor made of laminations of magnetic material, has a plurality of laminations of conductive, non-magnetic material interspersed throughout the rotor to act as flux guides for radially collimating the magnetic flux passing through the rotor.

6 Claims, 5 Drawing Figures

4,532,448

FLUX DIRECTOR, TOOTH SHIELD

DESCRIPTION

1. Technical Field

This invention relates to an improved, synchronous, reluctance motor and, more particularly, to an improvement for directing the magnetic flux in a toothed, synchronous reluctance motor.

2. Background Art

Increasingly, synchronous reluctance motors are made of a stack of laminations of magnetic material which make up the stator and rotor assemblies. An example of such motor is disclosed in the applicant's co-pending U.S. patent application Ser. No. 385,034 filed June 4, 1982 and entitled HIGH TORQUE ROBOT MOTOR. This motor comprises a laminated outer stator assembly, a laminated inner stator assembly and a laminated rotor assembly. The laminations of the stators and the rotor are all ring shaped and, when assembled, are arranged concentrically with the rotor stack being concentrically positioned between the inner and outer stator assemblies. Electrical coils wound on pole pieces of the inner and outer stator assemblies generate a magnetic flux which passes through the rotor between the inner and outer stator assemblies. All of the pole pieces of the stators and the rotor are provided with corresponding, opposed teeth. The rotor teeth are slightly misaligned with respect to the stator teeth and are caused to follow a changing magnetic pattern, produced by energizing, sequentially, the coils wrapped on the stator pole pieces, all as more fully explained in the above referenced co-pending patent application.

A problem in such motors has been that the magnetic fields generated in the stator assemblies tend to bloom or bulge between laminations, thereby distorting the magnetic flux path from the straight through path which was intended by the designers. This causes various distortions in the flux density of the magnetic material in a lamination stack. For minimum torque ripple, it is important to have radially collimated flux paths when driving the motor from digital-to-analog converters and using programmed read-only memories to correct for saturation distortion. These techniques are often used in microstepped motors. Corrected saturation distortion increases the torque per watt dissipated in the motor as well as reduces torque ripple and vibration and the associated acoustical noise.

Still another problem is that in such motors, when a winding is energized with a "chopper" switching regulator, and the rotor teeth are misaligned with the stator teeth because of high torque load, leakage flux will bridge between the rotor and the stator from the tooth to the valley producing a negative torque. This negative torque subtracts from the useful torque and results in reduced motor torque output. This torque is alternating current dependent and therefore is also speed dependent so that the higher the motor's speed, the greater will be the negative torque.

DISCLOSURE OF INVENTION

The above and other problems of electric motors of the type having winding coils and stator and rotor assemblies made of laminations of magnetic material are overcome by the present improvement of a plurality of conductive, non-magnetic plates which are interspersed between the laminations, most especially in the rotor, to act as magnetic flux guides. In the preferred embodiment of the invention, the laminations of the stator, the rotor and the flux guides are ring shaped and have corresponding, opposed teeth with the teeth of the magnetic flux guides being aligned between the rotor teeth. In the preferred embodiment, the rotor is rotatably mounted concentrically between inner and outer stator stacks.

The number of such flux guides which are added to the stack of laminations can be increased until the percentage of magnetic material in the laminations displaced is significant enough to cause a decrease in the performance of the motor. Thinner magnetic flux fields can improve operation as more can be added to the stack before the amount of magnetic material is significantly reduced, however, this will increase manufacturing cost since separate dies must be used to stamp out these laminations separately from those of the stator.

In operation, the flux guides isolate one set of lamination in a stack magnetically from the others by adding a gap between them. The leakage flux is also blocked by eddy currents which are set up in the conductive flux guides, thus shielding alternating currents. This isolation between sets of laminations directs the flux straight through the rotor within each block of laminations and prevents blooming.

The teeth of the flux guides are aligned with the valley of the magnetic rotor teeth, so that the AC flux from the stators will be repelled from the valley areas of the rotor. This eddy current repulsion increases the effective torque of the motor when the magnetic teeth are misaligned under heavy loads.

It is an object of this invention to increase torque by using eddy current repulsion under heavy torque loads.

It is therefore an object of the present invention to minimize torque ripple in a synchronous, reluctance motor.

It is yet another object of the present invention to provide an inexpensive mechanism for radially collimating the magnetic flux paths within a synchronous, reluctance motor.

It is yet a further object of the invention to reduce negative torque in a synchronous, reluctance motor by collimating the magnetic flux paths.

The foregoing and other objectives, features and advantages of the invention will be more readily understood upon consideration of the following detailed description of certain preferred embodiments of the invention, taken in conjunction with the accompanying drawings.

BEST MODE FOR CARRYING OUT THE INVENTION

Figure 1:
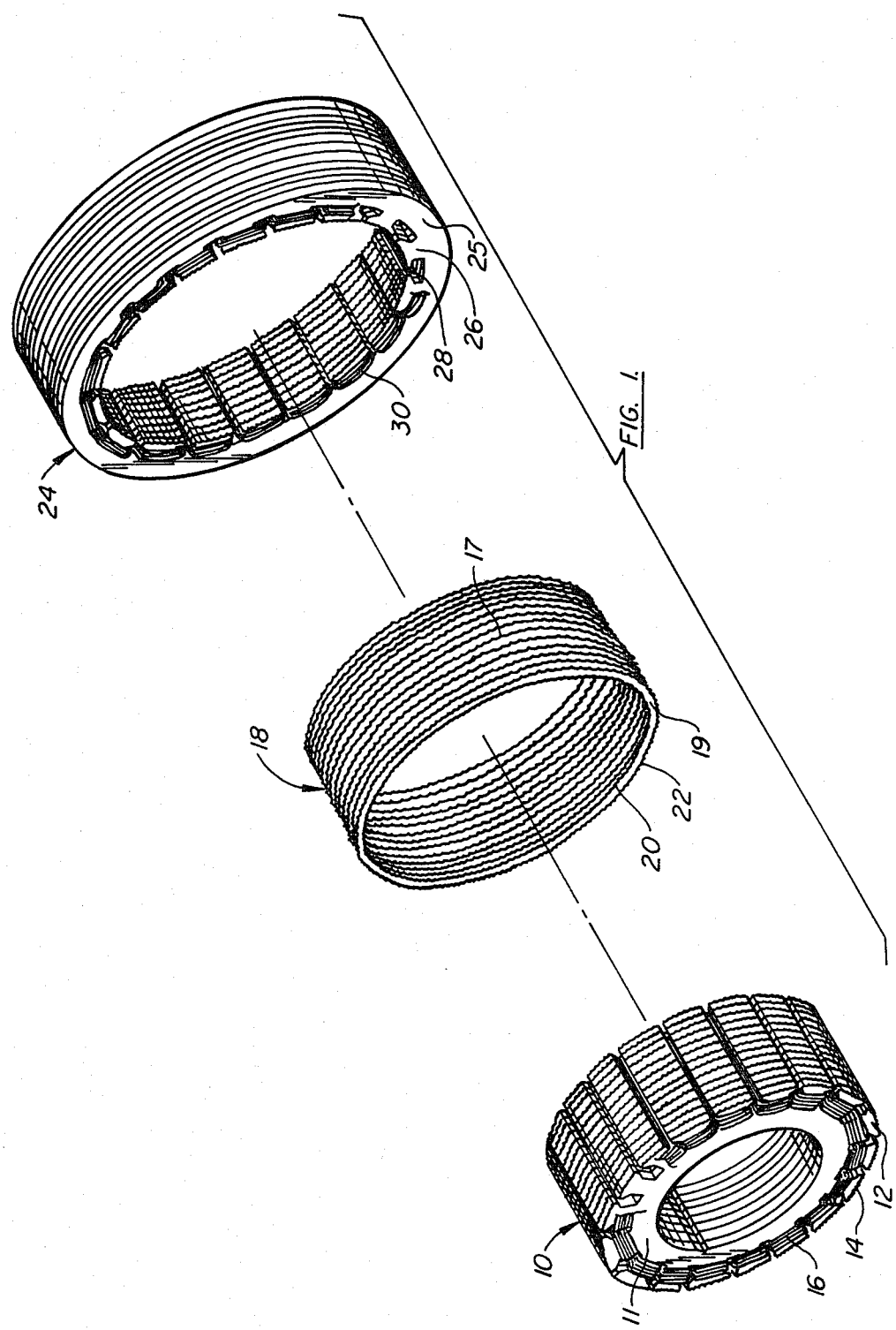
FIG. 1 is an exploded, perspective view of the inner and outer stator assemblies and the rotor assembly of the motor according to the invention.
Figure 2:
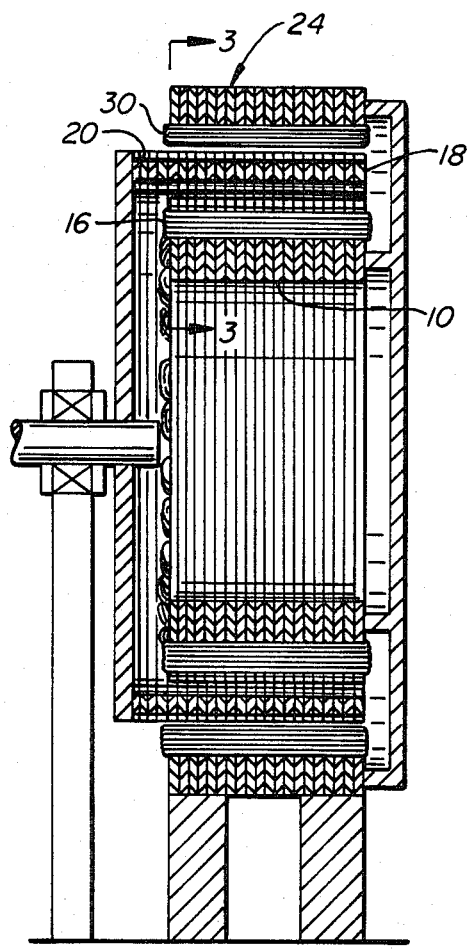
FIG. 2 is a vertical, sectional view through the motor of FIG. 1.

Referring now more particularly to FIGS. 1 and 2, the inner stator assembly 10 is comprised of a plurality of laminations 11 made of a magnetic material in the form of a ring. Each lamination 11 is comprised of a plurality of inner stator pole pieces 12 having a plurality of pole piece teeth 14 thereon. Separate electrical coils 16 are wound about each pole piece 12. Similarly, the rotor 18 is comprised of a plurality of ring shaped laminations 19 of magnetic material. The rotor laminations 19 have a plurality of teeth 22 and 20 on the inside and outside circumference, respectively, of the rotor laminations. The outer stator assembly 24 is also comprised of a plurality of laminations of magnetic material, each of which has a plurality of radially arranged pole pieces 26 each having a plurality of projecting stator pole piece teeth 28 thereon. Separate coils 30 surround each pole piece. As is evident from the figures, the inner stator assembly 10, the outer stator assembly 24, and the rotor assembly 18 are arranged concentrically with the rotor 18 being rotatably mounted between the inner stator assembly 10 and the outer stator assembly 24.

Figure 3:
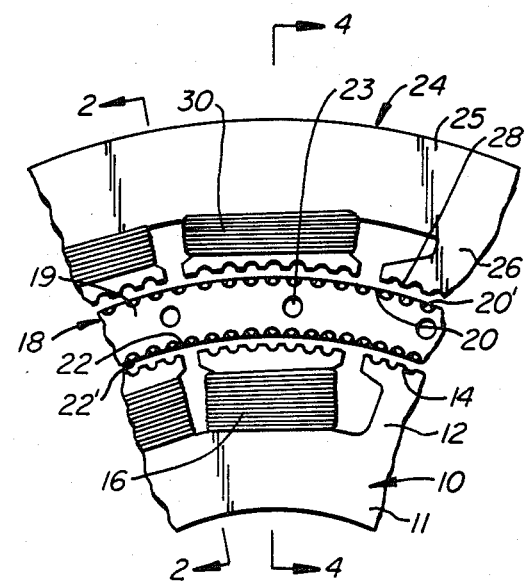
FIG. 3 is an enlarged view, with portions broken away, taken along lines 3—3 in FIG. 2.
Figure 4:
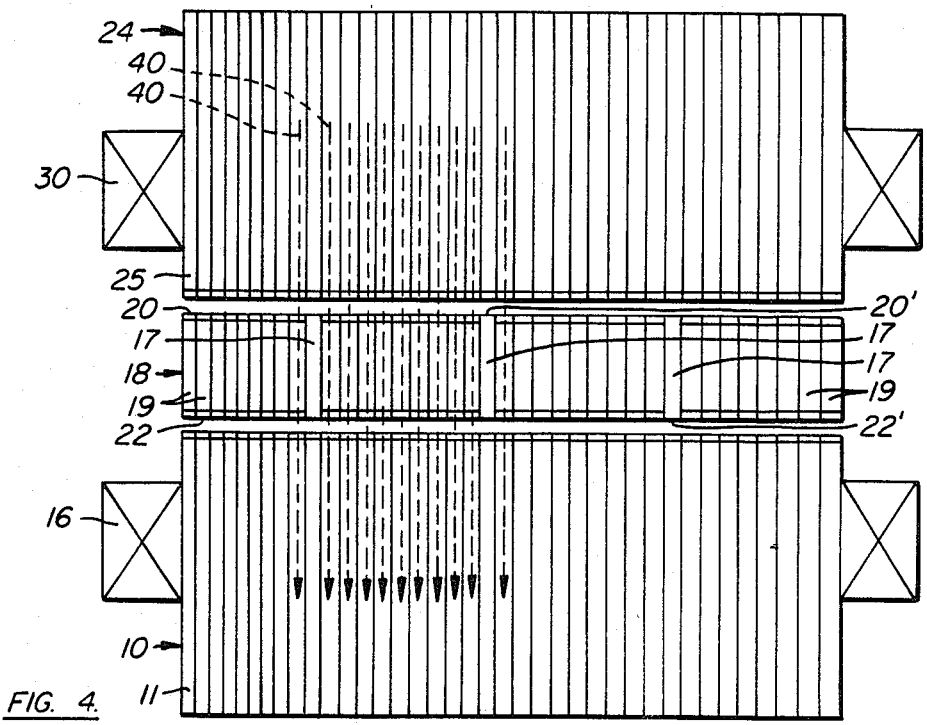
FIG. 4 is an enlarged, sectional view, taken generally along the lines 4—4 in FIG. 3, illustrating the flux path after the installation of the flux guides according to the invention.

Thus far, the motor described in reference to FIG. 1 is substantially identical to that described in the above-identified co-pending application of the applicant. Referring now more particularly to FIGS. 3 and 4, which are enlarged views of a portion of the stator and rotor stacks, it can be seen that each of the laminations 19 has a series of radially spaced inserting holes 23 for purposes of aligning the laminations so that the teeth 20 on the outer circumference of the laminations 19 and the teeth 22 on the inner circumference of the laminations 19 are all aligned for all of the laminations. As mentioned above, these teeth 20 and 22 correspond to the stator pole teeth 28 and 14, but have slightly different spacing.

Figure 5:
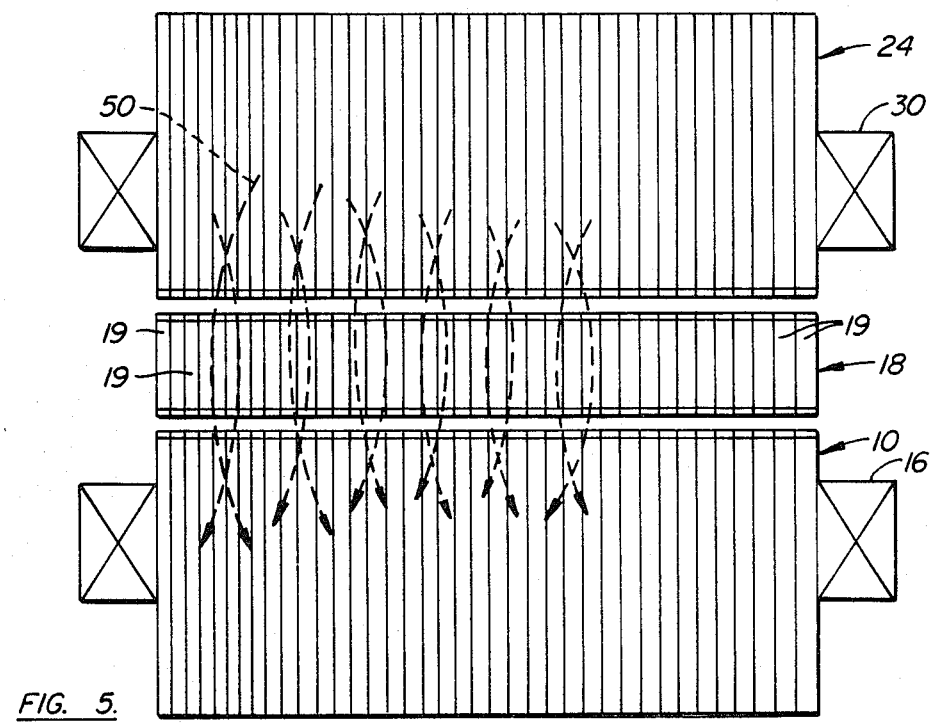
FIG. 5 is a view similar to FIG. 4 but illustrating the magnetic flux path in the absence of the flux guides of the invention.

Interspersed between the laminations 19 are identically configured laminations 17 made of a non-magnetic material, such as brass. The laminations 17 can be stamped from the same tooling as is used to stamp the laminations 19. The laminations 17 also have a plurality of outer, circumferential teeth 20' and inner, circumferential teeth 22' and also have inserting holes 23, however, the inserting holes are repunched to align the teeth 20' and 22' so that when the lamination stack of the rotor 18 is assembled, the teeth 20' and 22' will lie between the teeth 20 and 22 of the other laminations 19, as illustrated in FIG. 3. As illustrated by the dashed flux lines 40 in FIG. 4, the flux director laminations 17 will cause the flux lines generated by the coils 30 and 16 to travel along essentially straight lines, that is to be radially collimated. Without the presence of these flux director laminations 17, the radial flux lines will adopt non-radially collimated paths 50, as illustrated in FIG. 5.

While in the preferred embodiment the flux guide laminations 17 have only been illustrated as being interspersed between the rotor laminations 19, in other embodiments the flux guides could be interspersed between the stator laminations as well. While this somewhat improves the performance of the motor, it is not as crucial as having the laminations in the rotor since the magnetic coils tend to force the flux lines to take a relatively straight path.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

I claim:

1. An electric motor of the type having a plurality of opposed pairs of stator pole pieces, each stator pole piece having a plurality of projecting teeth, a rotor movably positioned between the stator pole piece pairs and having corresponding teeth opposing the stator pole teeth, the stator pole pieces and the rotor being made of laminae of magnetic material extending in a series of parallel planes perpendicular to the length of the rotor, separate electric coils encircling each stator pole piece, the coils of opposing stator pole pieces being connected in pairs and wound so as to generate magnetic fluxes of opposite polarity transversely through the rotor wherein the improvement comprises magnetic flux guide laminae of non-magnetic, electrically conductive material arranged parallel to and interspersed between the rotor laminae to guide the magnetic flux generated by the coils diametrically through the rotor in planes perpendicular to its length.

2. An electric motor as recited in claim 1 wherein the magnetic flux guide laminae also have corresponding teeth which are aligned between the rotor teeth.

3. An electric motor as recited in claim 2 wherein the flux guide teeth are aligned with the valleys of the rotor teeth, whereby alternating polarity magnetic flux from the stator pole teeth will be repelled from the valley areas between the rotor teeth.

4. An electric motor as recited in claims 1 or 2 wherein the laminae and flux guide laminae are ring shaped.

5. An electric motor as recited in claim 4 wherein the rotor is rotatably mounted concentrically between the stator pole pieces.

6. An electric motor as recited in claim 1 wherein the motor is a toothed, synchronous, reluctance motor.

* * * * *